United States Patent
Baran, Jr. et al.

(10) Patent No.: US 7,521,492 B2
(45) Date of Patent: Apr. 21, 2009

(54) SELF-EXTINGUISHING POLYMER COMPOSITION

(75) Inventors: Jimmie R. Baran, Jr., Prescott, WI (US); Anthony P. Manzara, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 605 days.

(21) Appl. No.: 11/141,877

(22) Filed: Jun. 1, 2005

(65) Prior Publication Data

US 2006/0276595 A1 Dec. 7, 2006

(51) Int. Cl.
*C08K 9/00* (2006.01)

(52) U.S. Cl. .................. 523/200; 523/212; 524/222; 524/230; 524/237

(58) Field of Classification Search ................ 525/222, 525/230, 233; 524/222, 230, 233; 523/200, 523/212
See application file for complete search history.

(56) References Cited

U.S. PATENT DOCUMENTS

| | | |
|---|---|---|
| 2,801,185 A | 7/1957 | Iler |
| 3,645,917 A | 2/1972 | Vandenberg |
| 3,694,383 A | 9/1972 | Azami |
| 4,264,703 A | 4/1981 | Crivello |
| 4,268,450 A | 5/1981 | Frankel et al. |
| 4,288,262 A | 9/1981 | Flanagan et al. |
| 4,304,705 A | 12/1981 | Heilmann et al. |
| 4,340,716 A | 7/1982 | Hata et al. |
| 4,379,201 A | 4/1983 | Heilmann et al. |
| 4,393,199 A | 7/1983 | Manser |
| 4,414,384 A | 11/1983 | Berkowitz et al. |
| 4,483,978 A | 11/1984 | Manser |
| 4,503,211 A | 3/1985 | Robins |
| 4,522,958 A | 6/1985 | Das et al. |
| 4,601,344 A | 7/1986 | Reed, Jr. et al. |
| 4,737,559 A | 4/1988 | Kellen et al. |
| 4,879,419 A | 11/1989 | Johannessen |
| 4,891,438 A | 1/1990 | Ahad |
| 4,985,340 A | 1/1991 | Palazzotto et al. |
| 5,061,330 A | 10/1991 | Reed, Jr. et al. |
| 5,124,463 A | 6/1992 | Ampleman |
| 5,143,785 A | 9/1992 | Pujol et al. |
| 5,164,521 A | 11/1992 | Manzara et al. |
| 5,204,219 A | 4/1993 | Van Ooij et al. |
| 5,215,860 A | 6/1993 | McCormick et al. |
| 5,223,056 A | 6/1993 | Ahad |
| 5,316,600 A | 5/1994 | Chan et al. |
| 5,464,900 A | 11/1995 | Stofko, Jr. et al. |
| 5,507,891 A | 4/1996 | Zeigler |
| 5,565,650 A | 10/1996 | Johannessen et al. |
| 5,616,883 A | 4/1997 | Hamilton et al. |
| 5,639,546 A | 6/1997 | Bilkadi |
| 5,648,407 A | 7/1997 | Goetz et al. |
| 5,681,904 A | 10/1997 | Manzara |
| 5,741,997 A | 4/1998 | Johannessen |
| 5,939,182 A * | 8/1999 | Huang et al. ................. 428/323 |
| 6,479,614 B1 | 11/2002 | Ampleman et al. |
| 6,562,159 B2 | 5/2003 | Ampleman et al. |
| 6,586,483 B2 | 7/2003 | Kolb et al. |
| 7,252,912 B2 * | 8/2007 | Kataoka et al. ............... 430/17 |
| 2004/0185252 A1 | 9/2004 | Schilke et al. |

FOREIGN PATENT DOCUMENTS

| | | |
|---|---|---|
| EP | 0 372 756 A2 | 6/1990 |
| EP | 0 372 756 A3 | 6/1990 |
| EP | 0 372 756 B1 | 6/1990 |
| EP | 0 633 280 A1 | 1/1995 |
| EP | 1 141 062 B1 | 10/2001 |

OTHER PUBLICATIONS

G. Odian, "Principles of Polymerization", (1991), 3rd Edition, John Wiley & Sons, Inc., New York.
Encylcopedia of Polymer Science and Engineering, "Cationic Polymerization", (1985), pp. 730-814, vol. 2, John Wiley & Sons, New York.
Lee and Neville, "Handbook of Epoxy Resins", (1967), McGraw-Hill, Inc., New York.
P.F. Bruins, "Epoxy Resin Technology", (1968), John Wiley & Sons, Inc., New York.
A. Madlung, "The Chemistry Behind the Air Bag", Products of Chemistry, (Apr. 1996), Vo. 73, No. 4.

* cited by examiner

*Primary Examiner*—Bernard Lipman
(74) *Attorney, Agent, or Firm*—Kent S. Kokko

(57) ABSTRACT

A composition is described comprising an organic polymer or a polymerizable monomer, having dispersed therein an azido polymer surface-modified particle phase, in an amount sufficient to reduce the flammability of the polymer.

17 Claims, No Drawings

SELF-EXTINGUISHING POLYMER COMPOSITION

FIELD OF THE INVENTION

The present invention is directed to self-extinguishing polymer composition and articles prepared therefrom.

BACKGROUND

Polymers have been modified with various additives in attempts to reduce the flammability (or increase the combustion resistance). Such additives have included phosphites, phosphates, thiophosphoric acid esters containing halogenated alkyl radicals and other halogenated organic compounds. With many such additives, they must be added at relatively high weight percentages that may adversely affect the physical and/or optical properties of the resulting articles. Polytetrafluoroethylene has been added, as an anti-drip and flame retardant agent, to many polymers, but adversely affects the clarity and transparency of molded articles made therefrom. Glass fibers may be added, but the addition adversely affects the polymer matrix and optical properties. In many applications, polymer compositions are rendered opaque by the addition of pigments to mask the reduced optical properties.

More recently there is an increasing need for new flame-retardants for polymer applications. Although existing products are effective at providing flame retardancy at low cost, concerns have been raised regarding the health and environmental risks as they are consider environmentally persistent, bioaccumulative materials. In some European countries there are proposals to ban the use of halogenated and heavy metal containing retardants.

Azido containing compounds and polymers ("azido polymers") are important in the fields of explosives and propellants because the azido ($-N_3$) group is highly energetic and can be incorporated into a polymer or oligomer at high weight percentage loadings. A useful class of azido polymers are oligomers, polymers or copolymers described as azido-substituted polyethers, e.g., glycidyl azide polymer ("GAP") and bis(azidomethyl)oxetane polymer ("BAMO"). Generally, the product of polymerization is a relatively low molecular weight polymer or oligomer (e.g., 500-25,000 number average molecular weight). Alternatively, it can be a higher molecular weight polymer (e.g., 25,000-100,000 MW) as described in U.S. Pat. Nos. 3,694,383; 3,645,917; 4,483,978; and 4,879,419.

SUMMARY

In one aspect, the present invention is directed to a polymer composition comprising an organic polymer selected from the group consisting of thermoplastic polymers, thermoset polymers, elastomers and mixtures thereof, having dispersed therein an azido polymer surface-modified particle phase, in an amount sufficient to reduce the flammability of the polymer. Preferably the azido polymer is a glycidyl azide polymer.

In another aspect, the invention provides a polymerizable composition comprising the surface modified nanoparticles and one or more polymerizable monomers. When polymerized, the resulting polymers have reduced flammability.

The polymer and polymerizable compositions of the present invention are useful in the preparation of shaped articles, such as those produced by casting, molding or extrusion. Included are automobile parts, electric motor housings, appliances, computer equipment such as monitor housings, aircraft parts, glass replacement, optical and headlamp lenses. Because the additive (azido polymer surface-modified particle phase) may be added at sufficient levels to reduce the flammability of the article without deleteriously affecting the optical properties, the composition is particularly useful in those applications where transparency or clarity is desired but where heretofore, opaque polycarbonates have been used.

The present invention overcomes problems in the art of providing a polymer composition that will not support combustion, is readily compounded with the polymers and reduces or eliminates the exposure risks associated with conventional flame retardant additives such as polybrominated biphenyls. Additionally, the additive does not generally adversely affect the mechanical or optical properties of the resulting polymers.

The nanoparticle phase may comprise silica, titania, alumina, zirconia, vanadia, ceria, iron oxide, antimony oxide, tin oxide, aluminum/silica and combinations thereof, and are less than 100 nanometers in average particle size.

The term "surface-modified nanoparticle" refers to a particle that includes surface groups attached to or coated on the surface of the particle. The surface groups modify the character of the particle and may be coated on the nanoparticles, or covalently- or ionically-bonded to the nanoparticles.

The terms "particle diameter" and "particle size" refer to the average cross-sectional dimension of a particle. If the particle is present in the form of an aggregate, the terms "particle diameter" and "particle size" refer to the average cross-sectional dimension of the aggregate.

The terms "thermoset" and "thermoplastic" have their normal meaning in the polymer chemistry art. A "thermoset" resin is a cured resin that has been exposed to an energy source (e.g. heat and/or radiation) sufficient to make the resin incapable of flowing or results from chemical crosslinking reaction of reactive species. The term "thermosetting" means an uncured thermoset resin. A "thermoplastic" resin is one that is capable of softening or flowing when heated and of hardening again when cooled.

"azido" refers to $-N_3$, bonded to a carbon atom;

"azido polymer" or "azide polymer" refers to a polymer, copolymer, or oligomer having an attached azido group or an attached azido containing group;

"self extinguishing" refers to the inability of a material to sustain combustion without the addition of an external heat source. In the present invention, the flames extinguishes within 10 seconds, preferably within 5 seconds.

DETAILED DESCRIPTION

The azido polymer used as a reactant in the present invention can be any polymer, copolymer, oligomer, etc., that contains pendant azido ($-N_3$) groups, or a pendant azido containing group. Preferred azido polymers include linear or branched glycidyl azide polymers (GAP), such as GAP polymers having hydroxy-terminal ends, known as diols or polyols, as well as GAP polymers that do not include hydroxy terminated ends, known as GAP plasticizers. Examples of these azido polymers are described in U.S. Pat. No. 4,268,450 (Frankel), U.S. Pat. No. 4,891,438 (Ahad), U.S. Pat. No. 5,124,463 (Ampleman), U.S. Pat. No. 5,223,056 (Ampleman), U.S. Pat. No. 6,479,614 (Ampleman) incorporated herein by reference. Other useful azido polymers include polyoxetane polymers that include one or more azido-group-containing repeating units. Specifically, these azido polymers can include those derived, for example, from 3,3-bisazidomethyloxetane (BAMO) and 3-azidomethyl-3-methyl oxetane (AMMO). Such azido polymers are described, for example, in U.S. Pat. Nos. 4,393,199, 4,414,384, and 4,483,978.

In one preferred embodiment, the azido polymer has the general formula:

$$[X-(R)_n]_m-L \qquad (I)$$

wherein:

X represents a hydroxyl, azido, mercapto, alkoxy, nitro, cyano, or amino (including mono- and di substituted alkyl and aryl amino) group and preferably X is an azido or a hydroxyl group.

R represents a divalent monomer group, containing an —N₃ group, derived from a cyclic ether such as, for example, —CH₂CH(CH₂N₃)O—, —CH₂C(CH₃)(CH₂N₃)CH₂O—, CH(CH₂N₃)CH₂O—, —CH₂C(CH₂N₃)₂CH₂O—, —CH(CH₂N₃)CH(CH₂N₃)O—, and —CH₂CH(N₃)CH₂O—.

L represents a mono-, di-, tri-, tetra-, penta-, hexavalent etc., alkyl radical. Non-limiting examples of monovalent radicals are methyl and ethyl. Non-limiting examples of polyvalent alkyl radicals are ethylene, methylene, propylene, 1,2,3-propanetriyl, 2-ethyl-2-methylene-1,3-propanediyl, 2,2-dimethylene-1,3-propanediyl, etc.;

L and X may be taken together to form a cyclic structure; corresponding to the valency of L, m can be from 1 to 6; and n represents any positive integer equal to at least 1, n is preferably at least 2, and n is more preferably at least 5.

The azido polymer of Formula (I) can be produced by methods well known to those skilled in the art of synthetic organic chemistry. Examples of these methods are disclosed in U.S. Pat. Nos. 3,645,917 and 4,879,419.

In another preferred embodiment, the azido polymer (corresponding to R of Formula I) has recurring units of the following general formula:

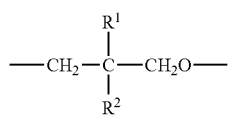

II wherein: R¹ represents an azido containing group such as —ZN₃, wherein Z is preferably a divalent linking group such as a lower alkylene group; and R² represents hydrogen, a lower alkyl group such as methyl, an alkoxy-containing group such as methoxy methyl, or an azido containing group that can be the same as or different than R¹. The azido polymer comprising the repeating units of Formula (II) can be prepared by procedures well known to those skilled in the art of synthetic organic chemistry such as disclosed, for example, in U.S. Pat. No. 3,694,383.

In another preferred embodiment, the azido polymer is a copolymer having repeating units derived from different comonomers, one or more of which contains an azido group or an azido-containing group. The comonomers can preferably be cyclic oxides having three to six ring atoms. Copolymerization of the monomers can preferably be carried out by cationic polymerization. The foregoing copolymers and their method of preparation are disclosed, for example, in U.S. Pat. No. 4,483,978.

The molecular weight of the azido polymer can preferably be in the range from about 100 to 100,000, more preferably in the range from about 500 to 25,000, and can most preferably be in the range from about 700 to 10,000. Any of these values can be adjusted, however, based on the chemical identity of the azido polymer, whether the azido polymer contains other pendant groups, whether the azido group is directly connected to the backbone or is connected through a linking group, the processing technique to be used, the desired properties of the crosslinked polymer material, etc.

Preferably, the azido polymer can contain at least about 5 weight percent, more preferably at least about 20 weight percent, and even more preferably at least about 30 or 40 weight percent azido (—N₃) groups, based upon the total weight of the azido polymer. The upper practical limit of weight percent of azido groups of presently produced azido polymers is about 60 percent. The azido groups may be terminal in addition to being pendant to the polymer.

The foregoing azido polymer of Formulas I and II preferably have a low halogen content to ensure that the polymer has the desired stability properties. Choosing reaction conditions and catalysts to ensure the quantitative conversion of the halogen functionality in the polymer precursor to azide generally accomplish the low halogen content. The term "low halogen content" means that the polymer has less than about 2 weight percent halogen; more preferably, the polymer has less than about 1 weight percent halogen; and most preferably, less than about 0.5 weight percent halogen, based upon the total weight of the polymer. The term halogen refers to chlorine, bromine, or iodine covalently bound to a carbon atom of the polymer.

One or more crosslinking agents may be employed in combination with the azido polymer of Formulas I and II. The choice of an appropriate crosslinking agent depends on the functional groups on the azide-containing polymer. Thus, if hydroxyl groups are present on the azide-containing polymer, then crosslinking agents for polyols could be employed (e.g., isocyanates).

Preferably, a crosslinking agent for polyols is employed in combination with an azido polymer having multiple hydroxyl end groups. Preferred crosslinking agents in this case are polyisocyanates, including but not limited to, hexamethylene diisocyanate; diphenylmethane diisocyanate; bis-(4-isocyanatocyclohexyl)methane, 2,4-toluene diisocyanate, and others known in the art.

The polymer composition includes inorganic nanoparticles that are surface-modified by the azido polymer. By "surface modified" it is meant that the azido polymer is coated on, or covalently or ionically bonded to the nanoparticles. The inorganic nanoparticles, having a particle diameter of less than 100 nanometers, are disposed in a polymer matrix. The surface-modified nanoparticles are preferably individual, unassociated (i.e., non-aggregated) nanoparticles dispersed throughout the polymer and preferably do not irreversibly associate with each other. The term "associate with" or "associating with" includes, for example, covalent bonding, hydrogen bonding, electrostatic attraction, London forces, and hydrophobic interactions.

Examples of suitable inorganic nanoparticles include silica and metal oxide nanoparticles including zirconia, titania, ceria, alumina, iron oxide, vanadia, antimony oxide, tin oxide, alumina/silica, carbonates such as calcium carbonate, and combinations thereof. The nanoparticles have an average particle diameter less than about 100 nm, preferably no greater than about 50 nm, more preferably from about 3 nm to about 50 nm, even more preferably from about 3 nm to about 20 nm, most preferably from about 3 nm to about 10 nm. If the nanoparticles are aggregated, the maximum cross sectional dimension of the aggregated particle is within any of these preferable ranges.

A variety of methods are available for modifying the surface of nanoparticles including, e.g., adding an azido polymer surface modifying agent to nanoparticles (e.g., in the form of a powder or a colloidal dispersion or suspension) and allowing the surface modifying agent to react with the nanoparticles. Other useful surface modification processes are described in, e.g., U.S. Pat. No. 2,801,185 (Iler) and U.S. Pat. No. 4,522,958 (Das et al.), and incorporated herein. Alternatively, the azido polymer may be coated on the surface of the inorganic nanoparticles (i.e. not covalently- or ionically bonded).

In preferred embodiments, compositions of the present invention may also include a ambiphilic coupling agent capable of bonding the azido polymer to the nanoparticles. The coupling agent has at least two reactive functionalities. One reactive functionality is capable of covalently bonding to the surface of the nanoparticles and the second is capable of bonding to the azido polymer. For example, reactive functionalities such as amino, hydroxyl, mercaptan, acrylate and methacrylate groups present on one component (the azido polymer, coupling agent, or the particles) can react with complementary reactive functionalities, such as oxirane, chloro-, bromo-, iodo-, alkyl, aziridine, anhydride, acrylate, methacrylate, or isocyanato groups, present on the other component (coupling agent or azido polymer). More than one coupling agent may be used. For example, two types of coupling agents which are capable of covalently bonding to each other may be employed where one coupling agent is capable of covalently bonding to the particles and the other is capable of covalently bonding to the glycidyl azide polymer.

Useful silane coupling agents include those with the following formula:

$$Q_a\text{-}R^3\text{—Si—}(Y)_b(R^4)_{3-b} \quad (III)$$

wherein:

$R^3$ is a substituted or unsubstituted divalent hydrocarbon bridging group of about 1 to 20 carbon atoms, optionally including in the backbone 1 to 5 moieties selected from the group consisting of —O—, —C(O)—, —S—, —SO$_2$— and —NR$^5$— groups, wherein $R^5$ is hydrogen, acetyl, or a alkyl group of 1 to 6 carbon atoms;

Y is —OR$^6$ where $R^6$ is an alkyl, aryl, heteroaryl, or aralkyl group of 1 to 8 carbon atoms, preferably methyl or ethyl;

$R^4$ is independently an alkyl, aryl, aralkyl or alkoxy group of 1 to 8 carbon atoms optionally substituted in available positions by oxygen, nitrogen and/or sulfur atoms;

a is 1 or 2;

b is 1 to 3;

Q is a reactive functional group capable of reacting with complementary functionalities of the X group of the azido polymer. Examples of Q include amino; hydroxyl; mercaptan; oxirane; chloro-, iodo-, and bromo-alkyl; aziridine; cyclic carboxylic anhydride; acrylate; methacrylate; acrylamide, and isocyanato groups. It should be understood that when present in the compositions of the invention the coupling agents may hydrolyze, in which case one or more of the "Y" or "OR$^4$", groups will be converted to a silanol or silanolate.

Preferred silanes have the structure Q-R$^3$—Si(OR$^4$)$_3$ wherein Q is preferably an isocyanate group, and $R^3$ and $R^4$ are as described above.

Additional information on ambifunctional silane coupling agents may be found in U.S. Pat. No. 5,204,219, issued to Van Ooij et al., U.S. Pat. No. 5,464,900, issued to Stofko et al., and U.S. Pat. No. 5,639,546, issued to Bilkadi and European Patent Application No. 0,372,756 A2. Alternatively the coupling agent can be a titanate or zirconate compound, such as "Tyzor™ Titanate, 11 commercially available from DuPont.

Preferably the azido polymer and the coupling agent are reacted together prior to surface modification of the inorganic nanoparticles. In this instance, the reaction may result in an azido polymer of the formula:

$$\text{L-}(R)_n\text{-}Q'\text{-}R^3\text{—Si—}(Y)_b(R^4)_{3-b} \quad (IV)$$

wherein Q' is a divalent linking group resulting from the reaction between the "X" group of the azido polymer of Formula I and the "Q" group of the silane coupling agent of Formula III. R, L, $R^3$, $R^4$, Y, n, m a b are as defined in Formulas I, II and III. For example, where Q is a hydroxyl and X is an isocyanate, Q' will be a urethane link.

Less preferably the nanoparticles are first reacted with the coupling agent, then further reacted with the azido polymer as the efficiency of functionalization of the inorganic nanoparticles is reduced.

The coupling agent, whether the coupling agent III is used per se, or the azido polymer coupling agent (IV), is used in amounts sufficient to react with 10 to 100% of the available functional groups on the inorganic nanoparticle (for example the number of available hydroxyl functional groups on silica nanoparticles). The number of functional groups is experimentally determined where a quantity of nanoparticles are reacted with an excess of coupling agent so that all available reactive sites are functionalized with a coupling agent. Lower percentages of functionalization may then be calculated from the result.

Generally, the amount of azido polymer (I), the coupling agent (III) or the azido coupling agent (IV) are used in amount sufficient to provide up to twice the equal weight of azido polymer relative to the weight of inorganic nanoparticles. Preferably the weight ratio of azido polymer to inorganic nanoparticles is 2:1 to 1:10.

The azido polymer surface-modified nanoparticles can be added to the polymer in amounts sufficient to provide a composition that has reduced flammability (as measured by comparison to the neat polymer), preferably in amounts sufficient to provide a composition that is self-extinguishing. Surface-modified nanoparticles may be present in the composition in varying amounts including, e.g., from about 5 to 50 wt. %, preferably from about 10 to 50 weight % based on the total weight of the composition. The surface-modified nanoparticles are preferably dispersed throughout the polymer, more preferably dispersed homogeneously throughout the polymer.

When considering the azido polymer, the coupling agent, and molecular weights thereof, the nanoparticles and amounts thereof, the azido polymer surface modified nanoparticles are added to the polymer in amounts sufficient so that the azide (—N$_3$) content of the polymer composition or polymerizable composition is 0.25 to 10 weight %, preferably from 0.5 to 5 weight percent azide.

If desired, the particles may further comprise a surface modifying agent in addition to the ambifunctional coupling agent. Such surface modify agents have surface groups that modify the solubility characteristics of the nanoparticles. The surface groups are selected to render the nanoparticle compatible with the polymer or polymerizable mixture (e.g. polymerizable monomers). Where used, such additional surface modifying agents are used in amounts sufficient to react with 1 to 100% of the available functional groups on the surface of the nanoparticles remaining after functionalization with the azido polymer. Generally 0 to 80% of the available functional groups on the surface of the inorganic nanoparticles may be functionalized with a surface-modifying agent prior to functionalization with the azido polymer.

Suitable surface groups can also be selected based upon the solubility parameter of the surface group and the polymer (or polymerizable mixture). Preferably the surface group, or the agent from which the surface group is derived, has a solubility parameter similar to the solubility parameter of the polymer. When the polymer is hydrophobic, for example, one skilled in the art can select from among various hydrophobic surface groups to achieve a surface-modified particle that is compatible with the hydrophobic polymer. Similarly, when the polymer is hydrophilic, one skilled in the art can select from hydrophilic surface groups. The particle can also include at least two different surface groups that combine to provide a particle having a solubility parameter that is similar to the solubility parameter of the polymer.

Suitable classes of surface-modifying agents include, e.g., silanes, organic acids organic bases and alcohols.

Particularly useful surface-modifying agents include silanes. Examples of useful silanes include organosilanes including, e.g., alkylchlorosilanes, alkoxysilanes, e.g., methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, butyltrimethoxysilane, butyltriethoxysilane, hexyltrimethoxysilane, octyltrimethoxysilane, 3-mercaptopropyltrimethoxysilane, n-octyltriethoxysilane, phenyltriethoxysilane, polytriethoxysilane, vinyltrimethoxysilane, vinyldimethylethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri(t-butoxy)silane, vinyltris(isobutoxy) silane, vinyltris(isopropenoxy)silane and vinyltris(2-methoxyethoxy)silane; trialkoxyarylsilanes; isooctyltrimethoxy-silane; N-(3-triethoxysilylpropyl)methoxyethoxyethoxy ethyl carbamate; N-(3-triethoxysilylpropyl)methoxyethoxyethoxyethyl carbamate; silane functional (meth)acrylates including, e.g., 3-(methacryloyloxy)propyltrimethoxysilane, 3-acryloyloxypropyltrimethoxysilane, 3-(methacryloyloxy)propyltriethoxysilane, 3-(methacryloyloxy)propylmethyldimethoxysilane, 3-(acryloyloxypropyl)methyldimethoxysilane, 3-(methacryloyloxy)propyldimethylethoxysilane, 3-(methacryloyloxy)methyltriethoxysilane, 3-(methacryloyloxy)methyltrimethoxysilane, 3-(methacryloyloxy)propyldimethylethoxysilane, 3-(methacryloyloxy)propenyltrimethoxysilane and 3-(methacryloyloxy)propyltrimethoxysilane; polydialkylsiloxanes including, e.g., polydimethylsiloxane, arylsilanes including, e.g., substituted and unsubstituted arylsilanes, alkylsilanes including, e.g., substituted and unsubstituted alkyl silanes including, e. g., methoxy and hydroxy substituted alkyl silanes, and combinations thereof.

Useful organic acid surface-modifying agents include, e.g., oxyacids of carbon (e.g., carboxylic acid), sulfur and phosphorus, and combinations thereof.

Representative examples of polar surface-modifying agents having carboxylic acid functionality include $CH_3O(CH_2CH_2O)_2CH_2COOH$ and 2-(2-methoxyethoxy)acetic acid having the chemical structure $CH_3OCH_2CH_2OCH_2COOH$ (hereafter MEAA) and mono (polyethylene glycol) succinate.

Representative examples of non-polar surface-modifying agents having carboxylic acid functionality include octanoic acid, dodecanoic acid and oleic acid.

Examples of suitable phosphorus containing acids include phosphonic acids including, e.g., octylphosphonic acid, laurylphosphonic acid, decylphosphonic acid, dodecylphosphonic acid and octadecylphosphonic acid.

Useful organic base surface-modifying agents include, e.g., alkylamines including, e.g., octylamine, decylamine, dodecylamine and octadecylamine.

Examples of other useful non-silane surface modifying agents include methacrylic acid, β-carboxyethyl acrylate, mono-2-(methacryloyloxyethyl)succinate, and combinations thereof A useful surface modifying agent that imparts both polar character and reactivity to the nanoparticles is mono (methacryloyloxypolyethyleneglycol) succinate.

Examples of suitable surface-modifying alcohols include, e.g., aliphatic alcohols including, e.g., octadecyl, dodecyl, lauryl and furfuryl alcohol, alicyclic alcohols including, e.g., cyclohexanol, and aromatic alcohols including, e.g., phenol and benzyl alcohol, and combinations thereof. Examples of surface-modifying groups particularly suitable for epoxy resin compositions are disclosed in U.S. Pat. No. 5,648,407 (Goetz et al.) and incorporated herein by reference.

Examples of useful organic polymers natural and synthetic rubber resins including thermosettable rubbers as well as thermoplastic rubbers and elastomers including, e.g., nitrile rubbers (e.g., acrylonitrile-butadiene), polyisoprene rubber, polychloroprene rubber, polybutadiene rubber, butyl rubber, ethylene-propylene-diene monomer rubbers (EPDM), Santoprene™ polypropylene-EPDM elastomers, ethylene propylene rubber, styrene-butadiene copolymers, styrene-isoprene copolymers, styrene-butadiene-styrene rubber, styrene-isoprene-styrene rubber, styrene-ethylene-butylene-styrene rubber, styrene-ethylene-propylene-styrene rubber, polyisobutytene rubber, ethylene vinyl acetate rubbers, silicone rubber including, e.g., polysiloxanes, methacrylate rubbers, polyacrylate rubbers including, e.g., copolymers of isooctyl acrylate and acrylic acid, polyesters, polyether esters, polyvinyl ethers, polyurethanes and blends and combinations thereof, including e.g., linear, radial, star and tapered block copolymers thereof.

Other useful elastomers include, e.g., fluoroelastomers including, e.g., polytrifluoroethylene, polyvinylidene fluoride, hexafluoropropylene and fluorinated ethylene-propylene copolymers, fluorosilicones and chloroelastomers including, e.g., chlorinated polyethylene, and combinations thereof.

Examples of useful thermoplastic resins include polyacrylonitrile, acrylonitrile-butadiene-styrene, styrene-acrylonitrile, cellulose and derivatives thereof, chlorinated polyether, ethylenevinylacetate, fluorocarbons including, e.g., polychlorotrifluoroethylene, fluorinated ethylene-propylene and polyvinylidene fluoride, polyamides including, e.g. polycaprolactam, polyhexamethylene adipamide, polyhexamethylene sebacamide, polyundecanoamide, polylauroamide and polyacrylamide, polyimides including, e.g., polyetherimide, polycarbonate, polyolefins including, e.g., polyethylene, polypropylene, polybutene and poly-4-methyl pentene, polyalkylene terephthalates including e.g., polyethyleneterephthalate, polyalkylene oxides including, e.g., polyphenylene oxide, polystyrene, polyurethane, polyisocyanurates, vinyl polymers including, e.g., polyvinyl chloride, polyvinyl acetate, polyvinyl alcohol, polyvinyl butyral, polyvinylpyrrolidone, polyvinylidene chloride and combinations thereof.

Useful thermoset resins include e.g., polyesters and polyurethanes and hybrids and copolymers thereof including, e.g., acylated urethanes and acylated polyesters, amino resins (e.g., aminoplast resins) including, e.g., alkylated urea-formaldehyde resins, melamine-formaldehyde resin, acrylate resins including, e.g., acrylates and methacrylates, vinyl acrylates, acrylated epoxies, acrylated urethanes, acrylated polyesters, acrylated acrylics, acrylated polyethers, vinyl ethers, acrylated oils and acrylated silicones, alkyd resins such as urethane alkyd resins, polyester resins, reactive urethane resins, phenolic resins including, e.g., resole resins, novolac resins and phenol-formaldehyde resins, phenolic/latex resins, epoxy resins including, e.g., bisphenol epoxy resins, aliphatic and cycloaliphatic epoxy resins, epoxy/urethane resin, epoxy/acrylate resin and epoxy/silicone resin, isocyanate resins, isocyanurate resins, polysiloxane resins including alkylalkoxysilane resins, reactive vinyl resins and mixtures thereof.

The present invention also provides a polymerizable mixture comprising the azido polymer surface modified nanoparticles and a polymerizable monomer. Polymerization can be achieved by various conventional free radical polymerization methods, which can be chemical or radiation initiated, including, e.g., solvent polymerization, emulsion polymerization, suspension polymerization, bulk polymerization and radiation polymerization including, e.g., processes using actinic radiation including, e.g., visible and ultraviolet light, electron beam radiation and combinations thereof. Useful monomers include free-radically polymerizable monomers, addition polymerizable monomers, and condensation polymerizable monomers, such as those used to prepare the thermoplastic and thermoset polymers previously described.

An initiator may be used in an amount effective to facilitate polymerization of the monomers present in the composition and the amount will vary depending upon, for example, the type of initiator, the molecular weight of the initiator, the intended application of the resulting adhesive composition and the polymerization process including, e.g., the temperature of the process.

Useful free radical initiators include thermal and photoactive initiators. The type of initiator used depends on the polymerization process. Examples of photoinitiators include benzoin ethers such as benzoin methyl ether and benzoin isopropyl ether, substituted benzoin ethers such as anisoin methyl ether, substituted acetophenones such as 2,2-dimethoxy-2-phenylacetophenone, and substituted alpha-ketols such as 2-methyl-2-hydroxypropiophenone.

The polymerizable composition can also include copolymeric photoinitiators including, e. g., 2-[4-(2-hydroxy-2-methylpropenoyl)phenoxy]ethyl-2-methyl-2-N-propenoylamino propanoate and the polymerizable photoinitiator available under the trade designation DAROCUR ZLJ 3331 from Ciba-Geigy, and photoacid generated initiators including, e.g., diaryliodoniumhexafluoroantimonate available under the trade designation SarCat CD-1012 from Sartomer (Exton, Pa.) and triarylsulfonium hexafluorophosphate available under the trade designation SarCat CD-101 1 (Sartomer).

Examples of suitable thermal initiators include peroxides such as benzoyl peroxide, dibenzoyl peroxide, dilauryl peroxide, cyclohexane peroxide, methyl ethyl ketone peroxide, hydroperoxides including, e.g., butyl hydroperoxide and cumene hydroperoxide, dicyclohexyl peroxydicarbonate, t-butyl perbenzoate, and azo compounds, for example, 2,2,-azo-bis(isobutyronitrile) (AIBN) and combinations thereof. Examples of commercially available thermal initiators include initiators available under the "VAZO" trade designation from DuPont Specialty Chemical (Wilmington, Del.) including VAZO 64 (2,2'-azobis(isobutyronitrile)), VAZO 52, VAZO 65 and VAZO 68, as well as thermal initiators available under the trade designation "Lucidol" from Elf Atochem North America, (Philadelphia, Pa.), and initiators available under the Celogen trade designation from Uniroyal Chemical Co. (Middlebury, Conn.).

Suitable free-radically polymerizable compounds containing at least one ethylenically unsaturated double bond, may be monomers and/or oligomers, such as (meth)acrylates, (meth)acrylamides, and other vinyl compounds capable of undergoing free-radical polymerization. Ethylenically unsaturated free radically polymerized materials may be monomers, oligomers, or blends thereof. Useful classes include, for example, vinyl-functional monomers that are monofunctional, difunctional or polyfunctional; free radically polymerizable macromers; and ethylenically unsaturated free-radically polymerizable polysiloxanes. Generally, the most useful ethylenically unsaturated free radically polymerizable monomers employed in this invention are vinyl-functional starting materials. Such vinyl starting materials include but are not limited to acrylic acid and its esters, methacrylic acid and its esters, vinyl-substituted aromatics, vinyl-substituted heterocyclics, vinyl esters, vinyl chloride, acrylonitrile, methacrylonitrile, acrylamide and derivatives thereof, methacrylamide and derivatives thereof, and other vinyl monomers polymerizable by free-radical means. Such monomers and specific examples are more fully described in U.S. Pat. No. 4,985,340, and such description is incorporated herein by reference.

Such monomers include mono-, di-, or polyacrylates and methacrylates such as methyl acrylate, methyl methacrylate, ethyl acrylate, isopropyl methacrylate, isooctyl acrylate, acrylic acid, n-hexyl acrylate, 2-ethylhexyl acrylate, stearyl acrylate, allyl acrylate, glycerol diacrylate, glycerol triacrylate, ethylene glycol diacrylate, diethylene glycol diacrylate, triethylene glycol dimethacrylate, 1,3-propanediol dimethacrylate, 1,6-hexanediol diacrylate, trimethylolpropane triacrylate, 1,4-cyclohexanediol diacrylate, pentaerythritol triacrylate, -tetraacrylate and -tetramethacrylate, the bis-acrylates and bis-methacrylates of polyethylene gycols of molecular weight 200-500; multi-reactive monomers such as epoxy (meth)acrylates, isocyanatoalkyl (meth)acrylates such as isocyanatoethyl (meth)acrylate, hydroxyalkyl (meth)acrylates, such as hydroxyethyl- and hydroxypropyl (meth)acrylates, acrylated epoxies, such as ethoxylated bisphenol A di(meth)acrylate, glycidyl (meth)acrylate; unsaturated amides such as acrylamide, methylene bis-acrylamide and β-methacrylaminoethyl methacrylate; and vinyl compounds such as styrene, divinylbenzene, divinyl adipate and various vinyl azlactones as are disclosed in U.S. Pat. No. 4,304,705. Mixtures of more than one monomer can be used as desired.

Suitable cationically polymerizable monomers and/or oligomers typically contain at least one cationically polymerizable group such as epoxides, cyclic ethers, vinyl ethers, vinylamines, side-chain unsaturated aromatic hydrocarbons, lactones and other cyclic esters, lactams, oxazolines, cyclic carbonates, cyclic acetals, aldehydes, cyclic amines, cyclic sulfides, cyclosiloxanes, cyclotriphosphazenes, certain olefins and cycloolefins, and mixtures thereof, preferably epoxides and vinyl ethers. Other cationically polymerizable groups or monomers described in G. Odian, "Principles of Polymerization" Third Edition, John Wiley & Sons Inc., 1991, NY. and "Encyclopedia of Polymer Science and Engineering," Second Edition, H. F. Mark, N. M. Bikales, C. G. Overberger, G. Menges, J. I. Kroschwitz, Eds., Vol. 2, John Wiley & Sons, 1985, N.Y., pp. 729-814 are also useful in the practice of the present invention.

Particularly useful examples include cyclic ether monomers, including epoxide monomers described in U.S. Pat. No. 4,985,340 and such description is incorporated herein by reference. A wide variety of commercial epoxy resins are available and listed in "Handbook of Epoxy Resins" by Lee and Neville, McGraw Hill, New York (1967) and in "Epoxy Resin Technology" by P. F. Bruins, John Wiley & Sons, New York (1968). Preferably, when used in conductive adhesives, the epoxy resins are "electronic grade," that is, low in ionic contaminants.

Cationically-polymerizable vinyl and vinyl ether monomers are also particularly useful in the practice of this invention and are described in U.S. Pat. No. 4,264,703, and such description is incorporated herein by reference.

Useful epoxy resins can include propylene oxide, epichlorohydrin, styrene oxide and epoxies based upon bisphenol A, such as, EPON-828-LS™ electronic grade epoxy resins available from Shell Chemicals, or novolac epoxies, such as, EPON-164™ (also available from Shell Chemicals) or their equivalents from other manufacturers. Additional useful epoxy resins include dicyclopentadiene dioxide, epoxidized polybutadiene such as the Poly BD™ resins available from Elf Atochem, 1,4-butanediol diglycidyl ether, and resorcinol diglycidyl ether. Also useful are the cycloaliphatic epoxies, such as cyclohexene oxide and the ERL™ series of resins available from Union Carbide, such as vinylcyclohexene dioxide (ERL-4206™), 3,4-epoxycyclohexylmethyl-3,4-epoxycyclohexanecarboxylate (ERL-4221™), bis(3,4-epoxy-6-methylcyclohexylmethyl)adipate (ERL-4299™); 1,4-butanediol diglycidyl ether, (for example, Heloxy 67™ available from Shell Chemical), polyglycidyl ether of phenol-formaldehyde novolak (e.g., DER-431™ and DER-438™, available from Dow Chemical Co., polyglycol diepoxide (e.g., DER 736™, available from Dow Chemical Co.), and mixtures thereof as well as mixtures thereof with co-curatives, curing agents or hardeners that also are well known. Representative of these well-known co-curatives or hardeners that can be used are acid anhydrides such as maleic anhydride, cyclopentanetetracarboxylic acid dianhydride, pyromellitic anhydride, cis-1,2-cyclohexanecarboxylic acid anhydride, amine curing agents (such as 2,4,6-tris(dimethylaminomethyl)phenol, diethylene triamine, tetraethylene pentamine, phenalkamines, and materials sold under trade names such as Jeffamine™ and Versamide™) and mixtures thereof.

When preparing compositions containing epoxy monomers, hydroxy-functional materials can be added. The hydroxyl-functional component can be present as a mixture or a blend of materials and can contain mono- and polyhydroxyl containing materials. Preferably, the hydroxyl-functional material is at least a diol. When used, the hydroxyl-functional material can aid in chain extension and preventing excess crosslinking of the epoxy during curing, e.g., increasing toughness of the cured composition.

When present, useful hydroxyl-functional materials include aliphatic, cycloaliphatic or alkanol-substituted arene mono- or poly-alcohols having from about 2 to about 18 carbon atoms and two to five, preferably two to four hydroxy groups, or combinations thereof. Useful mono-alcohols can include methanol, ethanol, 1-propanol, 2-propanol, 2-methyl-2-propanol, 1-butanol, 2-butanol, 1-pentanol, neopenyl alcohol, 3-pentanol, 1-hexanol, 1-heptanol, 1-octanol, 2-phenoxyethanol, cyclopentanol, cyclohexanol, cyclohexylmethanol, 3-cyclohexyl-1-propanol, 2-norbornanemethanol and tetrahydrofurfuryl alcohol.

Polyols useful in the present invention include aliphatic, cycloaliphatic, or alkanol-substituted arene polyols, or mixtures thereof having from about 2 to about 18 carbon atoms and two to five, preferably two to four hydroxyl groups.

Examples of useful polyols include 1,2-ethanediol, 1,2-propanediol, 1,3-propanediol, 1,4-butanediol, 1,3-butanediol, 2-methyl-1,3-propanediol, 2,2-dimethyl-1,3-propanediol, 2-ethyl-1,6-hexanediol, 1,5-pentanediol, 1,6-hexanediol, 1,8-octanediol, neopentyl glycol, glycerol, trimethylolpropane, 1,2,6-hexanetriol, trimethylolethane, pentaerythritol, quinitol, mannitol, sorbitol, diethiene glycol, triethylene glycol, tetraethylene glycol, glycerine, 2-ethy-2-(hydroxymethyl)-1,3-propanediol, 2-ethyl-1,3-pentanediol, 1,4-cyclohexanedimethanol, 1,4-benzenedimethanol, and polyalkoxylated bisphenol A derivatives. Other examples of useful polyols are disclosed in U.S. Pat. No. 4,503,211.

Higher molecular weight polyols include the polyethylene and polypropylene oxide polymers in the molecular weight ($M_n$) range of 200 to 20,000 such as the Carbowax™ polyethyleneoxide materials available from Union Carbide, caprolactone polyols in the molecular weight range of 200 to 5,000 such as the Tone™ polyol materials available from Union Carbide, polytetramethylene ether glycol in the molecular weight range of 200 to 4,000, such as the Terathane™ materials available from DuPont, polyethylene glycol, such as PEG 200 available from Union Carbide, hydroxyl-terminated polybutadiene resins such as the Poly BD™ materials available from Elf Atochem, phenoxy resins, such as those commercially available from Phenoxy Associates, Rock Hill, S.C., or equivalent materials supplied by other manufacturers.

Acid-catalyzed step growth polymerizations include, but are not limited to, the reaction of multifunctional isocyanates (polyisocyanates) with multifunctional alcohols (polyols) to form polyurethanes, the reaction of multifunctional epoxies with multifunctional alcohols, and the cyclotrimerization of multifunctional cyanate esters to crosslinked polytriazine resins.

Particularly useful multifunctional alcohol, isocyanate, and epoxide components that can be cured by acid-catalyzed step-growth polymerization using catalysts of the present invention are described in U.S. Pat. Nos. 4,985,340, 4,503,211 and 4,340,716, and such description is incorporated herein by reference.

Suitable multifunctional cyanate esters that can be cured by catalyzed cyclotrimerization are described in U.S. Pat. Nos. 5,143,785 and 5,215,860 and such description is incorporated herein by reference. Suitable multireactive monomers that can be cured include glycidyl(meth)acrylate, hydroxy(alkyl)(meth)acrylates such as hydroxyethyl acrylate, isocyanatoethyl methacrylate, and the like.

Mixtures of aforementioned classes of monomers with additives such as tackifiers, hardeners, cocuratives, curing agents, stabilizers, sensitizers etc. can also be used in the polymerizable compositions of this invention. Furthermore, adjuvants, such as pigments, abrasive granules, stabilizers, light stabilizers, antioxidants, flow agents, bodying agents, flatting agents, antistats, colorants, inert fillers, binders, blowing agents, fungicides, bacteriocides, surfactants, plasticizers, and other additives as known to those skilled in the art can be added to the compositions of this invention. These can be added in an amount effective for their intended purpose, as long as they do not interfere with the polymerization of the compositions of the invention. Additionally, in compositions containing radiation-sensitive catalysts or initiators it is preferable that the adjuvants do not absorb radiation to which the catalysts or initiators are responsive.

Solvents, preferably organic, can be used to assist in dispersing the nanoparticles in the polymerizable monomers described supra and as a processing aid. Representative solvents include acetone, methyl ethyl ketone, cyclopentanone, methyl cellosolve acetate, methylene chloride, nitromethane, methyl formate, acetonitrile, gamma-butyrolactone, 1,2-dimethoxyethane(glyme), 3-methyl sulfolane, and propylene carbonate.

After polymerization, the resulting polymer may be crosslinked. Crosslinking can be achieved with or without a cross-linking agent by using high-energy radiation such as gamma or electron beam radiation. A cross-linking agent or a combination of crosslinking agents can be added to the mixture of polymerizable monomers to facilitate cross-linking.

Useful radiations curing cross-linking agents include multifunctional acrylates, such as those disclosed in U.S. Pat. No. 4,379,201 (Heilmann et al.), which include 1,6-hexanediol diacrylate, trimethylolpropane triacrylate, 1,2-ethylene glycol diacrylate, pentaerythritol tetraacrylate, 1,12-dodecanol diacrylate, and combinations thereof, and copolymerizable aromatic ketone co-monomers such as those disclosed in U.S. Pat. No 4,737,559 (Kellen et al.), and incorporated herein. Suitable ultraviolet light sources include, e.g., medium pressure mercury lamps and ultraviolet black light.

Useful condensation polymerizable monomers include those used to prepare polyesters, polyethers, polycarbonates, polyureas and polyurethanes.

Various methods may be employed to combine the surface-modified nanoparticles and the polymer. In one method, a colloidal dispersion of surface-modified nanoparticles and polymer are combined. Solvent present in the composition is then removed, leaving the surface-modified nanoparticles dispersed in the polymer. Evaporation including, e.g., distillation, rotary evaporation or oven drying may remove the solvent. Optionally, for some colloidal dispersions, e.g., aqueous colloidal dispersions, prior to addition of the polymer, a cosolvent (e.g., methoxy-2-propanol or N-methylpyrrolidone) may be added to the colloidal dispersion to assist removal of water. Water may also be removed by azeotropic distillation with an immiscible solvent such as toluene. After the polymer is added, the water and cosolvent are removed.

Another method for incorporating colloidal dispersions of surface-modified nanoparticles into a polymer includes drying the colloidal dispersion of surface-modified nanoparticles to a powder, followed by addition of the polymer or at least one component of the polymer into which the nanoparticles are to be dispersed. The drying step may be accomplished by conventional means such as oven drying or spray drying. The surface-modified nanoparticles preferably have a sufficient amount of surface groups to prevent irreversible agglomeration or irreversible aggregation upon drying. The drying time and the drying temperature is preferably minimized for nanoparticles having less than 100% surface coverage.

Alternatively, the nanoparticles may be compounded by melt processing. In this embodiment, the surface modified nanoparticle and the thermoplastic polymer are combined and the mixture melted with sufficient agitation to provide a uniform mixture. Alternatively the nanoparticles and pellets or powders of the thermoplastic polymer may be combined, and intimately mixed prior to melting. If melt processing is desired, the conditions time and temperature conditions are chosen such the decomposition of the azido polymer is less than 2 wt %, Generally, the matrix polymer should have a melting point of less than 200° C., preferably less that 150° C. It is known that glycidyl azide polymers decompose in minutes at 200° C., and at a rate of ~0.1%/hour at 150° C. as measure by weight loss due to evolution of nitrogen.

In another embodiment, the nanoparticles may be dispersed in a polymerizable monomer or mixture of monomers, which are then polymerized. The monomers may be thermally-, free-radically- or photochemically polymerized, is the presence of an appropriate catalyst, such as are know in the art. If desired, the polymerizable mixture may be foamed using techniques and foaming agents as are known in the art. Reference may be made to U.S. Pat. No. 6,586,483 (Baran et al.) incorporated herein by reference. If thermally polymerized, the composition comprising the polymerizable monomers and nanoparticles should be maintained at temperatures less than 200° C., preferably less than 150° C., to avoid decomposition of the azido polymer.

EXAMPLES

Unless otherwise noted, all reagents and solvents were or can be obtained from Aldrich Chemical Co., Milwaukee, Wis.

Hydroxy-terminated glycidyl azide polymer was prepared according to the method described in U.S. Pat. No. 5,164,521.

Isooctyltrimethoxysilane was obtained from Gelest Inc., Morrisville, Pa.

As used herein,

"IOA" refers to isooctyl acrylate;

"AA" refers to acrylic acid;

"IOA/AA" refers to a mixture of 87.5 weight percent IOA and 12.5 weight percent AA;

"IBA" refers to isobornyl acrylate;

"IOA/AA SYRUP" refers to a partially photopolymerized mixture of 87.5 weight percent IOA and 12.5 weight percent AA prepared according to the method described for the preparation of "Composition A" in U.S. Pat. No. 6,586,483, except that "IOA/AA SYRUP" did not include 1,6-hexanediol diacrylate;

"IBA SYRUP" refers to partially photopolymerized isobornyl acrylate prepared by a method analogous to that described for the preparation of "Composition A" in U.S. Pat. No. 6,586,483, except that "IBA SYRUP" did not include 1,6-hexanediol diacrylate.

"PEG-SILANE" refers to methoxyethoxyethoxyethoxyureidopropyltriethoxysilane, prepared according to the method described for the preparation of "Silane Coupling Agent B" in U.S. Pat. No. 6,586,483;

"EPON 828" refers to an epoxy resin obtained from Resolution Performance Products, Inc., Houston, Tex.;

Example 1

Preparation of Glycidyl Azide Polymer Having a Triethoxysilane Group (GAP-silane)

A solution of approximately 40 weight percent hydroxy-terminated glycidyl azide polymer in ethyl acetate (20.0 g) was mixed with 3-isocyanatotriethoxysilane (2.90 g) in ethyl acetate (20.0 g). Dibutyl tin dilaurate (1 drop) was added and the mixture was magnetically stirred overnight at room temperature. The ethyl acetate was removed under reduced pressure using a rotary evaporator to afford the GAP-silane product (23.28 g). No absorbances attributable to isocyanate groups were observed in the infrared spectrum of the product.

Example 2

Preparation of GAP- and Isooctyl-modified Silica Nanoparticles

Ammonium-stabilized silica sol (50.0 g; NALCO 2326, obtained from Nalco Chemical Co., Naperville, Ill.), 1-methoxy-2-propanol (60.0 g), the GAP-silane product of Example 1 (1.35 g), and isooctyltrimethoxysilane (3.05 g) were combined in a screw-cap glass jar. The jar was capped and was placed in an oven at a temperature of 80° C. overnight. The jar was then allowed to cool to room temperature and the mixture was poured into a glass dish. The mixture was dried in a forced air oven at 140° C. to afford 10.16 g of the product as a white powder.

Example 3

Preparation of GAP- and PEG-Silane-modified Silica Nanoparticles in Epoxy Resin

Ammonium-stabilized silica sol (250 g; NALCO 2327, obtained from Nalco Chemical Co., Naperville, Ill.), 1-methoxy-2-propanol (282.25 g), the GAP-silane product of Example 1 (28.88 g), and PEG-silane (12.8 g) were mechanically stirred together in a round bottom flask that was heated in an oil bath to a temperature of 80° C. After approximately 18 hours sufficient EPON 828 was added to the mixture to afford a new mixture that contained 38.5 weight percent EPON 828. A rotary evaporator was used to remove the volatile components from the mixture, first using a water bath at 60° C. and then using an oil bath at 80° C.

Example 4

Preparation of GAP- and Phenyl-modified Silica Nanoparticles in Epoxy Resin

Ammonium-stabilized silica sol (500 g; NALCO 2327, obtained from Nalco Chemical Co., Naperville, Ill.), 1-methoxy-2-propanol (600 g), the GAP-silane product of Example 1 (11.55 g), and phenyltrimethoxysilane (22.19 g) were mechanically stirred together in a round bottom flask that was heated in an oil bath to a temperature of 80° C. After approximately 18 hours, sufficient EPON 828 was added to the mixture to afford a new mixture that contained 40 weight percent EPON 828. A rotary evaporator was used to remove the volatile components from the mixture, first using a water bath at 60° C. and then using an oil bath at 80° C.

Example 5

Preparation of GAP- and Isooctyl-modified Silica Nanoparticles in Isooctyl Acrylate Ammonium-stabilized silica sol (500 g; NALCO 2326, obtained from Nalco Chemical Co., Naperville, Ill.), 1-methoxy-2-propanol (600 g), the GAP-silane product of Example 1 (35.51 g), and isooctyltrimethoxysilane (35.79 g) were combined in a round bottom flask and the mixture was mechanically stirred at 80° C. for 18 hours. Isooctyl acrylate was added to the flask in an amount sufficient to provide a mixture that contained 34.6 weight percent isooctyl acrylate. Phenothiazine was added to provide a composition that contained approximately 100 parts per million of phenothiazine. The 1-methoxy-2-propanol was then removed using a rotary evaporator.

Example 6

IOA/AA Foam Stabilized with GAP- and Isooctyl-modified Silica Nanoparticles

A mixture of IOA/AA syrup (2.0 g) was combined with 2.0 g of a mixture of 50 weight percent 2-ethylhexyl acrylate and 50 weight percent GAP- and isooctyl-modified silica nanoparticles of Example 2. The mixture was foamed with nitrogen gas introduced into the mixture using a "C" fritted gas dispersion tube. A portion of the foam was then poured onto a 2-inch by 3-inch glass slide and was photocured by passing the slide through a curing chamber that included a Fusion "D" bulb. The dimensions of the photocured foam were measured. The glass slide was vertically suspended from a rack in a fume hood and the lower edge of the photocured foam was ignited using a propane torch. After the foam was ignited, the torch was removed and the foam was observed to expand in size as it charred. The burning foam, which did not flow as it charred, was observed to self-extinguish within approximately ten seconds. The dimensions of the expanded charred foam were measured and the foam was found to have increased in thickness by 89%.

Example 7

IBA Foam Stabilized with GAP- and Isooctyl-modified Silica Nanoparticles

A mixture of IBA syrup (2.0 g) was combined with 2.0 g of a mixture of 50 weight percent 2-ethylhexyl acrylate and 50 weight percent GAP- and isooctyl-modified silica nanoparticles. The mixture was foamed with nitrogen gas introduced into the mixture using a "C" fritted gas dispersion tube. A portion of the foam was then poured onto a 2-inch by 3-inch glass slide and was photocured by passing the slide through a curing chamber that included a Fusion "D" bulb.

Comparative Example 1

Preparation of Isooctyl-modified Silica Nanoparticles

Ammonium-stabilized silica sol (1000 g; NALCO 2326, obtained from Nalco Chemical Co., Naperville, Ill.), 1-methoxy-2-propanol (1940 g), and isooctyltrimethoxysilane (61.42 g) were combined in a screw-cap glass jar. The jar was capped and was placed in an oven at a temperature of 80° C. overnight. The jar was then allowed to cool to room temperature and the mixture was poured into a glass dish. The mixture was dried in a forced air oven at 150° C. to afford the product as a white powder.

Comparative Example 2

IOA/AA Foam Stabilized with Isooctyl-modified Silica Nanoparticles

A mixture of IOA/AA syrup (2.0 g) was combined with 2.0 g of a mixture of 50-weight percent 2-ethylhexyl acrylate and 50 weight percent isooctyl-modified silica nanoparticles. The mixture was foamed with nitrogen gas introduced into the mixture using a "C" fritted gas dispersion tube. A portion of the foam was then poured onto a 2-inch by 3-inch glass slide and was photocured by passing the slide through a curing chamber that included a Fusion "D" bulb. The dimensions of the photocured foam were measured. The glass slide was vertically suspended from a rack in a fume hood and the lower edge of the photocured foam was ignited using a propane torch. After the foam was ignited, the torch was removed and the foam was observed to contract and flow as it burned, with essentially no charring. The burning foam was observed not to self-extinguish. The dimensions of the burned foam were measured and the foam was found to have decreased in thickness by 53%.

The invention claimed is:

1. A polymer composition comprising an organic polymer having dispersed therein a azido polymer surface-modified nanoparticle phase.

2. The polymer composition of claim 1 wherein said particles of said nanoparticle phase are 5 to 100 nanometers average particle size.

3. The polymer composition of claim 2 wherein said nanoparticles are 3 to 20 nanometers average particle size.

4. The polymer composition of claim 1 wherein said polymer is selected from thermoplastic and thermoset polymers.

5. The polymer composition of claim 1 wherein said azido polymer is of the formula:

$$(X-(R)_n)_m-L \quad\quad\quad (I)$$

wherein:
X represents a hydroxyl, azido, mercapto, alkoxy, nitro, cyano, or amino group,
R represents a a divalent monomer group, containing an —$N_3$ group, derived from a cyclic ether;
L represents an alkyl radical;
m can be from 1 to 6; and
n represents a positive integer equal to at least 1.

6. The polymer composition of claim 5 wherein R of said azido polymer is selected from —$CH_2CH(CH_2N_3)O$—, —$CH_2C(CH_3)(CH_2N_3)CH_2O$—, $CH(CH_2N_3)CH_2O$—, —$CH_2C(CH_2N_3)_2CH_2O$—, —$CH(CH_2N_3)CH(CH_2N_3)O$—, and —$CH_2CH(N_3)CH_2O$—.

7. The polymer composition of claim 5 wherein said azido polymer has a number average molecular weight of 700 to 10,000.

8. The polymer composition of claim 6 wherein said azido polymer is coated on said nanoparticles.

9. The polymer composition of claim 6 wherein said nanoparticles are covalently or ionically bonded to said azido polymer.

10. The polymer composition of claim 9 wherein said nanoparticles are silica nanoparticles and said azido polymer is bonded to the surface of said nanoparticles with an ambiphilic silane coupling agent.

11. The polymer composition of claim 10 wherein said ambiphilic silane coupling agent is of the formula $$Q_a\text{-}R^3-Si-(Y)_b(R^4)_{3-b} \quad\quad\quad (III)$$

wherein:
$R^3$ is a substituted or unsubstituted divalent hydrocarbon bridging group of about 1 to 20 carbon atoms, optionally including in the backbone 1 to 5 moieties selected from the group consisting —O—, —C(O)—, —S—, —$SO_2$— and —$NR^5$— groups, wherein $R^5$ is hydrogen, acetyl, or a alkyl group of 1 to 6 carbon atoms;
Y is —$OR^6$ where $R^6$ is an alkyl, aryl, heteroaryl, or aralkyl group of 1 to 8 carbon atoms;
$R^4$ is independently an alkyl, aryl, aralkyl or alkoxy group of 1 to 8 carbon atom; optionally substituted in available positions by oxygen, nitrogen and/or sulfur atoms;
a is 1 or 2;
b is 1 to 3;
Q is a reactive functional group capable of reacting with complementary functionalities of the the X group of the azido polymer.

12. The polymer composition of claim 1 wherein the weight ratio of azido polymer to inorganic nanoparticles is 2:1 to 1:10.

13. The polymer composition of claim 1 wherein said azido polymer comprises 5 to 50 wt. % of said azido polymer-functionalized nanoparticle phase.

14. The polymer composition of claim 1 wherein said azide content is is 0.25 to 10 weight % of said composition.

15. The polymer composition of claim 7 wherein said nanoparticles are silica, titania, alumina, zirconia, vanadia, ceria, iron oxide, antimony oxide, tin oxide, aluminum/silica and combinations thereof.

16. The polymer composition of claim 1 wherein said azido polymer functionalized nanoparticles further composes a surface-modifying agent.

17. The polymer composition of claim 1 wherein said azido functionalized nanoparticles are surface modified with an azido polymer of the formula $$L\text{-}(R)_n\text{-}(Q)'\text{-}R^3-Si-(Y)_b(R^4)_{3-b} \quad\quad\quad (IV)$$

L represents an alkyl radical;
R represents a a divalent monomer group, containing an —$N_3$ group, derived from a cyclic ether;
n represents a positive integer equal to at least 1;
Q' is a divalent linking group;
$R^3$ is a substituted or unsubstituted divalent hydrocarbon bridging group of about 1 to 20 carbon atoms, optionally including in the backbone 1 to 5 moieties selected from the group consisting of —O—, —C(O)—, —S—, —$SO_2$— and —$NR^5$— groups, wherein $R^5$ is hydrogen, acetyl, or a alkyl group of 1 to 6 carbon atoms;
Y is —$OR^6$ where $R^6$ is an alkyl, aryl, heteroaryl, or aralkyl group of 1 to 8 carbon atoms;
$R^4$ is independently an alkyl, aryl, aralkyl or alkoxy group of 1 to 8 carbon atoms optionally substituted in available positions by oxygen, nitrogen and/or sulfur atoms; and
b is to 3.

* * * * *

UNITED STATES PATENT AND TRADEMARK OFFICE
CERTIFICATE OF CORRECTION

PATENT NO. : 7,521,492 B2
APPLICATION NO. : 11/141877
DATED : April 21, 2009
INVENTOR(S) : Jimmie R. Baran, Jr.

It is certified that error appears in the above-identified patent and that said Letters Patent is hereby corrected as shown below:

Title Page,
Item (56), References Cited, Col. 2, OTHER PUBLICATIONS, Line 3, delete "Encylcopedia" and insert in place thereof -- Encyclopedia --.

Column 8,
Line 18, after "polymers" insert -- include --.
Lines 24-25, delete "ethylene propylene" and insert in place thereof
-- ethylene-propylene --.
Lines 28-29, delete "polyisobutytene" and insert in place thereof -- polyisobutylene --.
Line 29, delete "rubber" and insert in place thereof -- rubbers --.
Line 47, delete "e.g." and insert in place thereof -- e.g., --.

Column 12,
Line 2, delete "diethiene" and insert in place thereof -- diethlene --.
Line 45, delete "cocuratives" and insert in place thereof -- co-curatives --.

Column 17,
Claim 11, Line 42, after "consisting" insert -- of --.

Column 18,
Claim 11, Line 2, delete "atom;" and insert in place thereof -- atoms --.
Claim 16, Line 22, delete "composes" and insert in place thereof -- comprises --.
Claim 17, Line 45, delete "is to 3" and insert in place thereof -- is 1 to 3 --.

Signed and Sealed this

Twenty-fifth Day of August, 2009

David J. Kappos
*Director of the United States Patent and Trademark Office*